US009014677B2

(12) United States Patent
Stählin et al.

(10) Patent No.: US 9,014,677 B2
(45) Date of Patent: Apr. 21, 2015

(54) VOICE CONNECTION TO AN INTRASTRUCTURE FACILITY AFTER AN EVENT

(75) Inventors: Ulrich Stählin, Eschborn (DE); Marc Menzel, Weimar/Lahn (DE)

(73) Assignee: Continental Teves AG & Co. oHG (DE)

( * ) Notice: Subject to any disclaimer, the term of this patent is extended or adjusted under 35 U.S.C. 154(b) by 359 days.

(21) Appl. No.: 13/146,786

(22) PCT Filed: Feb. 2, 2010

(86) PCT No.: PCT/EP2010/051256
§ 371 (c)(1), (2), (4) Date: Oct. 17, 2011

(87) PCT Pub. No.: WO2010/089299
PCT Pub. Date: Aug. 12, 2010

(65) Prior Publication Data

US 2012/0034905 A1 Feb. 9, 2012

(30) Foreign Application Priority Data

Feb. 3, 2009 (DE) ......................... 10 2009 007 177
Jun. 3, 2009 (DE) ......................... 10 2009 026 680

(51) Int. Cl.
*H04M 3/42* (2006.01)
*G08G 1/00* (2006.01)

(52) U.S. Cl.
CPC ..................................... *G08G 1/205* (2013.01)

(58) Field of Classification Search
CPC ........... H04M 1/6091; H04M 2207/18; H04B 1/3877; B60R 11/0241; H04L 29/08108
USPC .......... 455/414.1, 569.2, 575.9, 414.2, 404.1, 455/425, 521; 340/425.5
See application file for complete search history.

(56) References Cited

U.S. PATENT DOCUMENTS 6,262,655 B1 * 7/2001 Yoshioka et al. .......... 340/425.5
2002/0115423 A1 * 8/2002 Hatae et al. .................... 455/404
2006/0229014 A1 * 10/2006 Harada et al. ................ 455/41.2
2008/0143497 A1 * 6/2008 Wasson et al. ............. 340/425.5
2009/0207007 A1 * 8/2009 Flick et al. .................... 340/436
2010/0015963 A1 1/2010 Hesse

FOREIGN PATENT DOCUMENTS

DE 102006023759 A1 11/2007
DE 102007051079 A1 4/2008
WO 2006067008 A1 6/2006

OTHER PUBLICATIONS

International Search Report issued in PCT/EP2010/051256 filed Feb. 2, 2010, mailed May 4, 2010.

* cited by examiner

*Primary Examiner* — Chuck Huynh
(74) *Attorney, Agent, or Firm* — RatnerPrestia

(57) ABSTRACT

Disclosed herein is a communication system for a vehicle for communicating with nearby vehicles which includes a control unit and a communication unit. After a triggering event occurs, an inquiry is sent to nearby vehicles whether a communication voice connection is to be established. Nearby vehicles can thereupon offer the establishment of the voice connection. This establishment can be accepted or rejected by the communication system.

13 Claims, 2 Drawing Sheets

VOICE CONNECTION TO AN INFRASTRUCTURE FACILITY AFTER AN EVENT

CROSS REFERENCE TO RELATED APPLICATIONS

This application is the U.S. National Phase Application of PCT International Application No. PCT/EP2010/051256, filed Feb. 2, 2010, which claims priority to German Patent Application No. 10 2009 007 177.6, filed Feb. 3, 2009, and German Patent Application No. 10 2009 026 680.1, filed Jun. 3, 2009, the contents of such applications being incorporated by reference herein.

FIELD OF THE INVENTION

The invention relates to the communication between a vehicle and an infrastructure facility. In particular, the invention relates to a communication system for a vehicle for the purpose of communication with an infrastructure facility, a vehicle with a communication system, a method for the communication of a vehicle with an infrastructure facility, a program element and a computer-readable medium.

BACKGROUND OF THE INVENTION

The invention relates to a so-called vehicle-to-infrastructure communication which is also called "car-to-infrastructure communication."

SUMMARY OF THE INVENTION

The invention provides an improved communication between vehicles and infrastructure facilities without stationary communication nodes.

Specified are a communication system for a vehicle for communicating with an infrastructure facility, a communication system for an infrastructure facility, a vehicle with a communication system, a method for the communication between vehicles and an infrastructure facility, a program element and a computer-readable medium according to the features of the independent patent claims. Developments of the invention are found in the subclaims.

It is pointed out here that the features described with regard to the communication system for the vehicle in the text which follows can also be implemented in the communication system for the infrastructure facility and as method steps in the method, and conversely. This also applies to the program element and the computer-readable medium.

According to one exemplary embodiment of the invention, a communication system for a vehicle for communicating with an infrastructure facility is specified which complies as a control unit for controlling the communication and a communication unit for conveying data to the infrastructure facility and for receiving data from the infrastructure facility.

The control unit is also arranged for rejecting an establishment of a communication voice connection between the vehicle and the infrastructure facility when a message sent by the infrastructure facility does not meet a required criterion.

According to a further exemplary embodiment of the invention, the control unit and the communication unit are arranged for conveying an inquiry to the infrastructure facility whether a communication voice connection is to be established between the vehicle and the infrastructure facility.

In other words, the communication system can enquire at the communication system of an infrastructure facility whether a communication voice connection is to be established. The communication unit of the infrastructure facility receives this request and can thereupon offer to the communication unit of the original vehicle to establish a voice connection. This offer can be rejected by the communication system of the original vehicle if the data which are transmitted with the offer do not meet a required criterion.

In this manner, it is possible to prevent unwanted infrastructure facilities from participating in the communication.

The vehicles can be, for example, motor vehicles or motor cycles.

According to a further exemplary embodiment of the invention, the criterion is met when the infrastructure facility is registered in a corresponding list of the communication system of the original vehicle.

According to a further exemplary embodiment of the invention, this list can be maintained by the driver of the vehicle. For this purpose, the communication system is equipped with an input and output unit which is arranged for the processing of the list by the driver of the vehicle. The driver can thus assemble a particular group of vehicles and/or infrastructure facilities in a list, which can then communicate with one another via a communication voice connection. All other vehicles and/or infrastructure facilities are rejected.

According to a further exemplary embodiment of the invention, the communication system also has a vehicle sensor system. The inquiry to the infrastructure facility and/or the nearby vehicles is conveyed only when the vehicle sensor system has detected a certain triggering event.

According to a further exemplary embodiment of the invention, this triggering event is the unfitness of the vehicle to drive, an accident of the vehicle, transmission of an ecall by a communication unit of the vehicle, (for example the same communication unit which also sends out the inquiry), a so-called ghost driver, that is to say driving in a lane for oncoming traffic, or triggering by the driver.

If the vehicle sensor system detects such an event, the inquiry is sent out to the infrastructure facility and/or the other vehicles. These can then send back an offer for establishing a communication voice connection if the drivers of the other vehicles or the operators of the infrastructure facility wish it, or fully automatically, depending on setting. This offer can then be accepted or rejected, for example in dependence on whether the nearby vehicle is entered in a corresponding list or not.

According to a further exemplary embodiment of the invention, the control unit is arranged for automatically accepting or automatically rejecting, respectively, the establishment of the communication voice connection depending on whether the criterion is met or not.

An intervention of the driver is not required. If the criterion is met, the communication voice connection to the infrastructure facility or to the nearby vehicle will be established automatically.

According to a further exemplary embodiment of the invention, the inquiry comprises an identification of the transmitting vehicle. Thus, vehicle-specific data are sent out in the inquiry so that the infrastructure facility or the nearby vehicles can identify the transmitting vehicle. In this manner, the communication systems in the infrastructure facility or the nearby vehicles can decide whether the establishment of a communication voice connection is to be offered or not.

According to a further exemplary embodiment of the invention, the inquiry contains an information item about the triggering event. In this manner, the communication systems of the infrastructure facility or of the nearby vehicles can decide (automatically or by user intervention) whether the establishment of a communication voice connection is to be offered or not.

According to a further exemplary embodiment of the invention, the communication system is arranged for receiving an inquiry from a corresponding communication system of the nearby vehicle. It is also arranged for the selection by the user of a type of triggering event for which the inquiry is to be indicated.

In this manner it is possible to avoid all enquiries for the establishment of a communication voice connection being indicated. Instead, only enquiries which are associated with selected events are indicated.

According to a further exemplary embodiment of the invention, the communication system is arranged for automatically offering a communication voice connection on reception of the inquiry when a preset condition is met.

In this manner, it is possible to automate the establishment of the communication voice connection.

According to a further exemplary embodiment of the invention, the offer for the establishment of a voice connection is sent out directly by the first vehicle instead of the inquiry and the infrastructure facility or the second vehicle can accept it directly, and, as a result, establish the voice connection directly. Other forms of the establishment of the voice connection are also conceivable but these always follow the basic arrangement that the first vehicle sends out the wish for communication and the second vehicle decides whether it complies with this wish or not.

According to a further exemplary embodiment of the invention, a vehicle having a communication system described above and in the text which follows is specified.

According to a further exemplary embodiment of the invention, a communication system for an infrastructure facility for the communication with a vehicle is specified, the communication system comprising: a control unit for controlling the communication and a communication unit for conveying data from the infrastructure facility to the vehicle and for receiving data from the vehicle. The control unit is arranged for creating an inquiry for establishing a communication voice connection with the vehicle, the creation of the inquiry being triggered by a conveyance of data from the vehicle to the infrastructure facility.

According to a further exemplary embodiment of the invention, a method for the communication of a vehicle with an infrastructure facility is specified in which data are conveyed from the vehicle to the infrastructure facility. As a result, an inquiry for the establishment of a communication voice connection is made by the infrastructure facility, whereupon the establishment of the communication voice connection is rejected by the vehicle when the inquiry sent by the infrastructure facility does not meet a required criterion.

According to a further exemplary embodiment of the invention, the inquiry for the establishment of the communication voice connection is triggered by the conveyance of the data.

According to a further exemplary embodiment of the invention, the inquiry for the establishment of the communication voice connection is triggered by the conveyance of the data.

According to a further exemplary embodiment of the invention, a program element is specified, which, when it is executed on a processor of a communication system described above, instructs the communication system to perform the method steps described above.

According to a further exemplary embodiment of the invention, a computer-readable medium is specified on which a program element is stored which, when it is executed on a processor of a communication system described above, instructs the processor to perform the method steps described above.

In this arrangement, the program element can be, for example, part of a software which is stored on a processor of the vehicle management. In this arrangement, the processor can also be the subject matter of the invention. Furthermore, this exemplary embodiment of the invention comprises a program element which already uses the invention from the start, such as also a program element which initiates an existing program for using the invention by means of an update.

According to a further exemplary embodiment of the invention, an identification information item is exchanged via a radio link in a first step, for example on a general radio channel for initiating a communication between nearby vehicles, for forming a communication interconnection, which identification information item is input in the communication system of each participating vehicle in a second step so that, after final acknowledgement by at least one other vehicle already belonging to the vehicle communication interconnection, it can enter into the latter.

In this manner, a turning-away from the broadcast approach described initially takes place in which all vehicles are connected to all communication facilities located within range. Instead, the formation of closed groups between the individual communication systems (and thus between the individual vehicles) is possible in which a completely closed radio communication can take place from vehicle to vehicle. There are no interfering influences by communication systems not belonging to the group and a more reliable and productive exchange of information within the group of vehicles is thus possible. The entry into this circle of closed communication is achieved, for example, by the initiation procedure described above which, in communication terms, represents a so-called handshake between the communication systems to be connected. The prerequisite for this is that the vehicles can contact the respective other vehicles of the group by radio after the occurrence of a triggering event in order to subsequently be able to accept or reject an offer of another vehicle to establish a communication voice connection. This process can comprise an exchange of identifications (so-called handshake). After this handshake, each communication system will recognize whether an information item comes from a vehicle of the group or from a strange vehicle.

BRIEF DESCRIPTION OF THE DRAWINGS

In the text which follows, exemplary embodiments of the invention are described with reference to the figures.

DETAILED DESCRIPTION OF EXEMPLARY EMBODIMENTS

The representations in the figures are diagrammatic and not to scale. In the figure description following, the same reference symbols are used for identical or similar elements.

Figure 1:
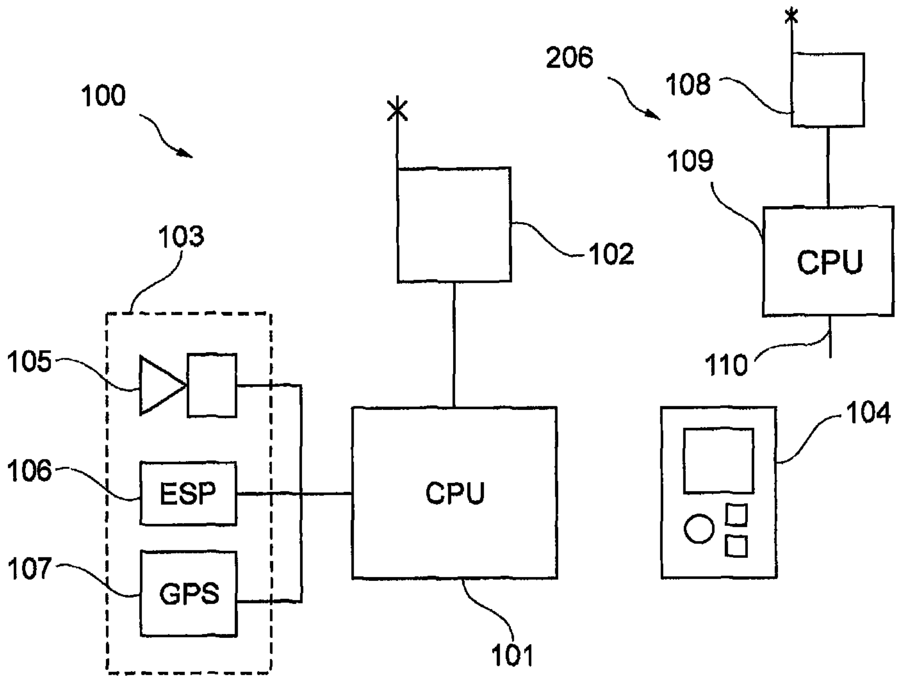
FIG. 1 shows a communication system according to one exemplary embodiment of the invention.

FIG. 1 shows a communication system 100 according to one exemplary embodiment of the invention. The communication system 100 comprises a central processing unit (CPU)

101 which is connected to a communication unit 102, a vehicle sensor system 103 and an input and output unit 104.

The vehicle sensor system 103 has, for example, a camera 105, an ESP sensor system 106 and a satellite navigation unit (GPS unit) 107.

It is pointed out that in the context of the present invention, GPS is representative of all global navigation satellite systems (GNSS) such as, e.g., GPS, Galileo, GLONASS (Russia), Compass (China), IRNSS (India), etc.

Naturally, other sensors can also be provided for detecting the events to be triggered.

Furthermore, FIG. 1 shows a communication system 206 for an infrastructure facility, which system can communicate with the vehicle communication system 100. The system 206 comprises a control unit 109, a communication unit 208 and possibly a communication interface 110 for linking to a central station. If a certain event occurs, an infrastructure facility is given the option to establish a voice connection to the initiator of the event. If the establishment of a voice connection is then requested by the infrastructure facility, this wish is indicated to the initiator, including an identification of the infrastructure facility which would like to establish the voice connection, and can accept or reject. Events for the voice connection can be:

a) If a vehicle breaks down and is no longer roadworthy;
b) a vehicle has an accident;
c) a vehicle has transmitted an ecall;
d) a vehicle is driving against the oncoming traffic (ghost driver);
e) a vehicle is lost or needs orientation aid (event triggered by vehicle occupants);
f) a vehicle needs medical assistance for vehicle occupants (event triggered by vehicle occupants).

Figure 2:
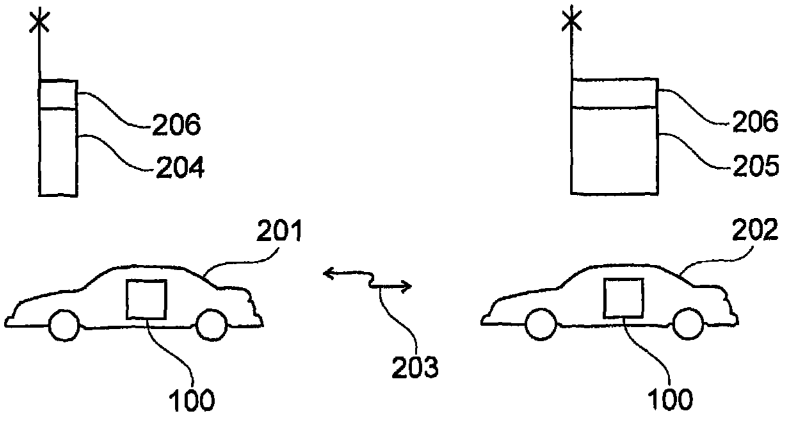
FIG. 2 shows two vehicles according to one exemplary embodiment of the invention.

FIG. 2 shows a first vehicle 201 and a second vehicle 202, which in each case comprise a communication system 100. A radio link 203 exists between the two communication systems 100.

Vehicle 201 triggers the event and the vehicle 202 or the infrastructure facility 204, 205 with corresponding communication systems 206 are given the option for a voice connection.

Each driver can determine whether an occurrence of a particular definable event, other vehicles or infrastructure facilities should be provided with the possibility of requesting a voice connection. Even if such a voice connection is offered by another vehicle 202 or the infrastructure facility 204 or 205, the driver (or the communication system 100) of the triggering vehicle 201 must still accept the voice connection. In this context, the voice connection option can be enabled generally for all events or for only selected events. Thus, for example, a driver of a first vehicle can determine that the option for establishing a voice connection is only offered to other vehicles when the first vehicle has broken down.

The option for establishing the communication voice connection is therefore advantageously sent along with the event as a message, e.g. as "voice establishment flag".

There are other possibilities how the voice establishment can be controlled:

a) The second vehicle 202 and/or the infrastructure facility 204, 205 receives the option for voice connection. The driver of the second vehicle 202 or the infrastructure facility thereupon offers the establishment of the voice connection whereupon the first vehicle 201 can reject this establishment.
b) The first vehicle 201 has to "accept automatically" for an event type. The second vehicle 202 or the infrastructure facility offers a voice connection for such an event, this is then accepted directly.
c) The second vehicle 202 and/or the infrastructure facility is quoted in a list "wanted helper" (e.g. friends, colleagues, rescue center . . .). This list can be influenced (that is to say edited) by the driver of the first vehicle 201. The second vehicle 202 or the infrastructure facility offers a voice connection after the event in the first vehicle 201 and the voice connection is thereupon established automatically.

In the indication of the option for a voice connection in the second vehicle 202 and/or the infrastructure facility, the reason for this is preferably also indicated (for example "broken down vehicle") and the location where the vehicle has broken down. The GPS unit 107 is provided for determining the location. In the first vehicle 201, it is indicated who wishes to offer the voice connection.

For this purpose, the second vehicle 202 and/or the infrastructure facility can enable other information items about the second vehicle, which can then be indicated in the first vehicle, to be released in addition to the position. This can be, for example, vehicle type, vehicle color, name of the driver, license plate etc.

The nearby vehicles 202 can set up events for which they wish to have indicated the option for voice connection. Restrictions can be:

a) Event type;
b) Distance from the event;
c) Transmitter of the event.

For example, the option for establishing a voice connection is only indicated if these are "wanted" contacts.

In addition, it is possible to specify whether a voice connection is offered automatically in the case of certain events or transmitters of events (e.g. friends, colleagues, etc.). If the first vehicle 201 also still accepts this communication voice connection automatically (for this event type and/or this vehicle 202 or this infrastructure facility, respectively), a voice connection is established fully automatically in the case of an event.

Technologies provided for the voice connection are direct communication connections, such as WLAN (802.11a/b/g/n, but also automotive WLAN 802.11p), UWB, Bluetooth, WiMax, etc. GSM, UMTS, LTE, etc. can also be used. The voice connection is then produced, for example, in the form of voiceover IP (VoIP).

Due to the option for the establishment of a voice connection after an event, it is possible in an easy and uncomplicated manner to obtain assistance and to offer assistance.

Figure 3:
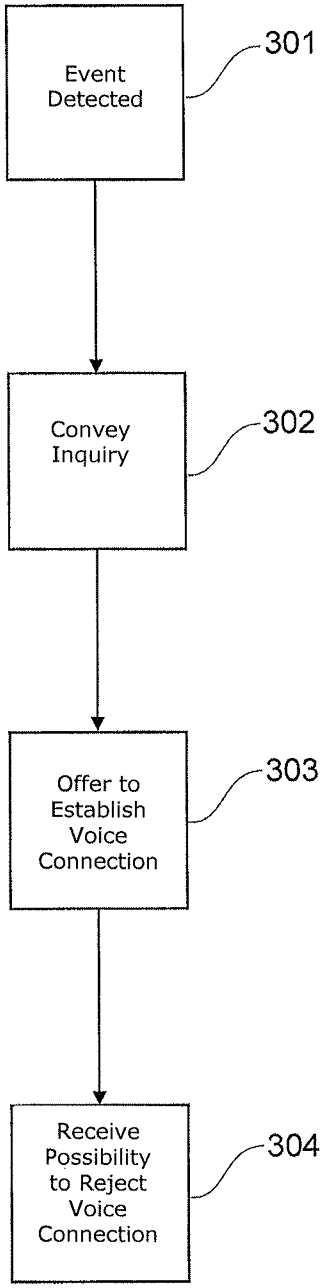
FIG. 3 shows a flow chart of a method according to one exemplary embodiment of the invention.

FIG. 3 shows a flow chart of a method according to one exemplary embodiment of the invention. In step 301, an event is detected by the vehicle sensor system of the first vehicle. The detection of this event triggers in step 302 the conveying of an inquiry to a nearby vehicle and/or an infrastructure facility. In other words, the nearby vehicle or the infrastructure facility receives the option for establishing a communication voice connection. In step 303, the second vehicle or the infrastructure facility thereupon offers to the first vehicle the establishment of the communication voice connection. In step 304, the first vehicle receives the possibility for rejecting the establishment of the communication voice connection.

In addition or as an alternative to the possibility of rejecting the establishment of the communication voice connection, the ultimate establishment of the communication voice connection can take place by means of the initiation procedure described above which, in this case, would replace step 304 or follow this step or precede it.

These method steps can be carried out fully automatically (apart from the input of the identification information, if required) if the corresponding criteria for this are stored in the communication system. For example, the acceptance or rejection of the establishment of the communication voice connection or the offering of the establishment of the communication voice connection by the second vehicle can optionally be triggered by a user.

As already stated, the communication system according to aspects of the invention can be used for the establishment of a voice connection to infrastructure units. This will be described in the text which follows, with reference to FIG. 2:

If a vehicle 201 (F1) breaks down, due to, e.g., damage, it is of importance for the infrastructure facility 205 (traffic management center) responsible for the road to know what has happened in order to be able to initiate appropriate measures, if necessary, or estimate the duration of the impediment. It is therefore possible to establish a voice connection between F1 and the traffic management center 205. For this purpose, road-side units (RSU) 204 (if present) are used which are the stationary equivalent of the communication unit in the vehicle.

Similar cases are:

a) Broken down vehicle and breakdown service by a rescue vehicle. In this connection, the voice connection can also be switched from the service center to the rescue vehicle. The RSUs can be, e.g., on freeways, the rescue telephones (orange-colored in Germany) by the roadside.

b) Rescue centers (PSAP) after an accident which did not lead to the triggering of an emergency call.

c) The traffic center can selectively accept voice connections to vehicles of a traffic jam in order to find out the precise cause. For this purpose, the driver of the vehicle must have enabled this possibility. If a vehicle thus enabled receives a traffic jam message and recognizes that it is located in this traffic jam, it sends out an identification via which the traffic center can communicate with the driver (concept of the traffic jam detectors).

To establish the voice connection, the procedure according to aspects of the invention and described above can be applied. No additional hardware is required.

In the text which follows, further exemplary embodiments are described:

1. First Example:

A vehicle breaks down on the freeway due to a defect. It therefore transmits via vehicle-to-infrastructure communication or vehicle-to-vehicle communication (C2X) a warning. This warning is received by an RSU of the traffic center and is indicated there. The traffic center thereupon establishes a voice connection to the vehicle which is also accepted by the vehicle and the traffic center can inform itself more exactly about the situation and offer assistance to the driver of the vehicle.

2. Second Example:

Two vehicles have a collision accident (F1 collides with F2). The ecall of the vehicles is not triggered and both drivers are too excited to activate it manually. However, they both activate the hazard flasher. This is also transmitted by C2X. An RSU receives this information and forwards it to a rescue center. It is recognized there that this is not a traffic jam since all other vehicles continue to drive. The rescue center thereupon establishes a communication connection to the vehicles. If this is accepted by the vehicles, the rescue center can provide assistance.

3. Third Example:

A traffic jam is detected by an RSU since the vehicles now only travel with a very low speed or are even stopped. A traffic jam message is thereupon sent out. A vehicle which is registered as traffic jam detector receives this traffic jam message and recognizes that it is located in the traffic jam. It thereupon transmits its identification and the traffic center can establish a voice connection to the vehicle. Via this voice connection it is possible to find out, e.g., what the reason for the traffic jam is.

The communication system according to aspects of the invention can also be used for establishing a voice connection with service vehicles by C2X communication. This will be described in the text which follows:

Service vehicles must frequently make their way through the traffic. In many cases, the drivers do not know the direction in which they are to steer their vehicles.

This is where this exemplary embodiment of the invention is applicable. If a vehicle travels with action signal (blue light) it also sends this information by C2X communication. In addition, the identification of a voice channel is also sent via which the occupants of the service vehicle can speak to other vehicles by broadcasting. If a vehicle receives the warning before the service vehicle, it additionally establishes a voice connection to the latter via the specified channel. The technology used for this does not need to be the C2X technology but it is also possible to make use of another technology more suitable for this purpose (e.g. because of the higher available bandwidth). For example, the voice communication is handled by Voice over IP.

Since it was the vehicles themselves which establish the voice connection and not the service vehicle, it is also left to each vehicle itself whether it makes use of this capability or not. If necessary, the occupants of the vehicle can control whether a voice connection is to be established in that they are given the option (e.g. by a symbol on a touchscreen).

In addition, a service vehicle can also compel vehicles within a fixed radius or area to output its voice messages to the occupants of the vehicles. As a result, e.g. warning messages can be propagated more easily.

The voice messages from the service vehicle do not need to be spoken by the occupants of the service vehicle in this arrangement. It is also possible to use tape announcements (“keep to the left, please”) or the service vehicle can be used as relay station for the voice radio of a center station.

This too, does not require any additional hardware,

Description of Embodiments of the Present Exemplary Embodiment:

1. First Example:

A rescue car 202 approaches an accident location. There is a high traffic volume on the multi-lane road. The rescue car activates its blue light and at the same time sends out the warning by DSRC. This warning also contains the identification of the voice channel which is handled via normal WLAN by Voice over IP. Other vehicles receive the warning, indicate this warning to the driver and at the same time open the voice channel. Via this voice channel, the co-driver of the rescue car can now direct all vehicles to the left-hand side of the road so that the rescue car can pass on the right.

2. Second Example:

The rescue center 205 wishes to establish contact with vehicles in a region in order to warn against a fire with strong smoke development. There are no infrastructure units 204 in the region. For this reason, service vehicles are sent into the region. These compel via DSRC by C2X other vehicles to output the voice channel of the service vehicle to the driver. This voice channel is not reproduced via WiMax. Via this channel, the service vehicles now send the voice directly from the service center, the connection between service center and service vehicle being implemented by public services radio.

Additionally, it should be pointed out that "comprising" and "having" does not exclude any other elements or steps and "a" or "one" does not exclude a multiplicity. Furthermore, it should be pointed out that features or steps which have been described with reference to one of the above exemplary embodiments can also be used in combination with other features or steps of other exemplary embodiments described above.

The invention claimed is:

1. A communication system for a vehicle for communication of a vehicle with an infrastructure facility, the communication system comprising:

a control unit for controlling the communication; and a communication unit for conveying data from the vehicle to the infrastructure facility and for receiving data from the infrastructure facility, wherein the control unit is configured to:

send an inquiry to the infrastructure facility in response to detecting an automatically triggered event at the vehicle, the inquiry indicating a request for establishment of a communication voice connection between the vehicle and the infrastructure facility, receive a response from the infrastructure facility offering to establish the communication voice connection, reject the establishment of the communication voice connection when the response sent by the infrastructure facility does not meet a required criterion, and accept establishment of the communication voice connection when the response sent by the infrastructure facility meets the required criterion, wherein the required criterion is met when the infrastructure facility is registered in a corresponding list of the communication system.

2. The communication system as claimed in claim 1, wherein the control unit and the communication unit are arranged for conveying an inquiry to the infrastructure facility as to whether a communication voice connection is to be established between the vehicle and the infrastructure facility.

3. The communication system as claimed in claim 2, further comprising:

a vehicle sensor system, wherein the inquiry is only conveyed when the vehicle sensor system has detected a triggering event.

4. The communication system as claimed in claim 3, wherein the triggering event is selected from the group consisting of unfitness of the vehicle to drive, accident of the vehicle, transmission of an e-call by a communication unit of the vehicle, driving in a lane for oncoming traffic, and triggering by the driver.

5. The communication system as claimed in claim 3, wherein the inquiry comprises an information item about the triggering event.

6. The communication system as claimed in claim 1, wherein the control unit is arranged for automatically accepting or automatically rejecting, respectively, the establishment of the communication voice connection depending on whether the criterion is met or not.

7. The communication system as claimed in claim 1, wherein the communication system is configured for receiving an inquiry from a corresponding communication system of a nearby vehicle, and wherein the communication system is configured for selection by a user of a type of triggering event for which the inquiry is to be indicated.

8. The communication system as claimed in claim 7, wherein the communication system is configured for automatically offering a communication voice connection on reception of the inquiry when a preset condition is met.

9. A vehicle with a communication system as claimed in claim 1.

10. A communication system for an infrastructure facility for communication with a vehicle, the communication system comprising:

a control unit for controlling the communication; and a communication unit for conveying data from the infrastructure facility to the vehicle and for receiving data from the vehicle, wherein the control unit is configured for:

sending an inquiry to the infrastructure facility in response to detecting an automatically triggered event at the vehicle, the inquiry indicating a request for establishment of a communication voice connection between the vehicle and the infrastructure facility, receiving a response from the infrastructure facility offering to establish the communication voice connection, rejecting the establishment of the communication voice connection when the response sent by the infrastructure facility does not meet a required criterion, and accepting the establishment of the communication voice connection when the response sent by the infrastructure facility meets the required criterion, wherein the required criterion is met when the infrastructure facility is registered in a corresponding list of the communication system.

11. A method for communication of a vehicle with an infrastructure facility, the method comprising the steps of:

conveying data from the vehicle to the infrastructure facility;

sending an inquiry to the infrastructure facility in response to detecting an automatically triggered event at the vehicle, the inquiry indicating a request for establishment of a communication voice connection between the vehicle and the infrastructure facility;

receiving a response from the infrastructure facility offering to establish the communication voice connection;

accepting the establishment of the communication voice connection when the response sent by the infrastructure facility meets the required criterion; and rejecting the establishment of the communication voice connection when the response sent by the infrastructure facility does not meet the required criterion, wherein the required criterion is met when the infrastructure facility is registered in a corresponding list of the communication system.

12. The method as claimed in claim 11, wherein the inquiry for the establishment of the communication voice connection is triggered by the conveyance of the data.

13. A non-transitory computer-readable medium on which a program element is stored which, when it is executed on a processor, instructs the processor to perform the following steps:

conveying data from a vehicle to an infrastructure facility;

sending an inquiry to the infrastructure facility in response to detecting an automatically triggered event at the vehicle, the inquiry indicating a request for establishment of a communication voice connection between the vehicle and the infrastructure facility;

receiving a response from the infrastructure facility offering to establish the communication voice connection;

accepting the establishment of the communication voice connection when the response sent by the infrastructure facility meets the required criterion; and rejecting the establishment of the communication voice connection when the response sent by the infrastructure facility does not meet the required criterion, wherein the required criterion is met when the infrastructure facility is registered in a corresponding list of the communication system.

* * * * *